(12) United States Patent
Hayes et al.

(10) Patent No.: US 9,817,750 B2
(45) Date of Patent: Nov. 14, 2017

(54) PROFILE-DEPENDENT WRITE PLACEMENT OF DATA INTO A NON-VOLATILE SOLID-STATE STORAGE

(71) Applicant: Pure Storage, Inc., Mountain View, CA (US)

(72) Inventors: John Hayes, Mountain View, CA (US); Shantanu Gupta, Mountain View, CA (US); John Davis, Mountain View, CA (US); Brian Gold, Mountain View, CA (US); Zhangxi Tan, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 155 days.

(21) Appl. No.: 14/323,876

(22) Filed: Jul. 3, 2014

(65) Prior Publication Data

US 2016/0004631 A1    Jan. 7, 2016

(51) Int. Cl.
| | | |
|---|---|---|
| *G06F 12/02* | (2006.01) | |
| *G06F 17/30* | (2006.01) | |
| *G06F 11/10* | (2006.01) | |
| *G06F 12/14* | (2006.01) | |

(52) U.S. Cl.
CPC .......... *G06F 12/0246* (2013.01); *G06F 11/10* (2013.01); *G06F 17/30* (2013.01); *G06F 17/30218* (2013.01); *G06F 12/1441* (2013.01); *G06F 2212/1016* (2013.01); *G06F 2212/7205* (2013.01); *G06F 2212/7207* (2013.01); *G06F 2212/7208* (2013.01)

(58) Field of Classification Search
None
See application file for complete search history.

(56) References Cited

U.S. PATENT DOCUMENTS

| | | |
|---|---|---|
| 6,725,392 B1 | 4/2004 | Frey et al. |
| 7,778,960 B1 | 8/2010 | Chatterjee et al. |
| 7,908,448 B1 | 3/2011 | Chatterjee et al. |
| 8,010,485 B1 | 8/2011 | Chatterjee et al. |
| 8,010,829 B1 | 8/2011 | Chatterjee et al. |

(Continued)

OTHER PUBLICATIONS

Storer, Mark W., Greenan, Kevin M., Miller L. Ethan, Voruganti, Kaladhar; Pergamum: Replacing Tape with Energy Efficient, Reliable, Disk-Based Archival Storage.

(Continued)

*Primary Examiner* — Yaima Rigol
(74) *Attorney, Agent, or Firm* — Womble Carlyle Sandridge & Rice LLP

(57) ABSTRACT

A method for storing user data is provided. The method includes distributing the user data throughout a plurality of storage nodes through erasure coding, wherein the plurality of storage nodes are housed within a single chassis that couples the storage nodes as a cluster, each of the plurality of storage nodes having nonvolatile solid-state memory for user data storage. The method includes performing analytics on user data and grouping portions of the user data according to results of the analytics. The method includes writing the user data to blocks of flash memory in the non-volatile solid-state memory, wherein each block receives portions of the user data grouped according to at least one of the results of the analytics.

20 Claims, 8 Drawing Sheets

(56) References Cited

U.S. PATENT DOCUMENTS

| | | | |
|---|---|---|---|
| 8,046,548 | B1 | 10/2011 | Chatterjee et al. |
| 8,086,911 | B1 | 12/2011 | Taylor |
| 8,145,838 | B1 | 3/2012 | Miller et al. |
| 8,244,999 | B1 | 8/2012 | Chatterjee et al. |
| 8,327,080 | B1 | 12/2012 | Der |
| 8,479,037 | B1 | 7/2013 | Chatterjee et al. |
| 8,498,967 | B1 | 7/2013 | Chatterjee et al. |
| 8,522,073 | B2 | 8/2013 | Cohen |
| 8,595,455 | B2 | 11/2013 | Chatterjee et al. |
| 8,621,145 | B1* | 12/2013 | Kimmel ............... G06F 12/0246 711/103 |
| 8,627,136 | B2 | 1/2014 | Shankar et al. |
| 8,700,875 | B1 | 4/2014 | Barron et al. |
| 8,856,619 | B1* | 10/2014 | Cypher ............... G06F 11/1044 714/6.2 |
| 8,862,840 | B2 | 10/2014 | Lee |
| 8,880,788 | B1* | 11/2014 | Sundaram ............ G06F 3/0688 711/103 |
| 2008/0295118 | A1 | 11/2008 | Liao |
| 2010/0268908 | A1 | 10/2010 | Ouyang et al. |
| 2011/0119462 | A1 | 5/2011 | Leach et al. |
| 2011/0264843 | A1* | 10/2011 | Haines ............... G06F 12/0246 711/103 |
| 2012/0191900 | A1* | 7/2012 | Kunimatsu ......... G06F 12/0223 711/103 |
| 2012/0221924 | A1* | 8/2012 | Flynn ................. G06F 11/1008 714/763 |
| 2012/0284587 | A1* | 11/2012 | Yu ........................ G06F 3/0608 714/773 |
| 2012/0297122 | A1* | 11/2012 | Gorobets ............ G06F 12/0246 711/103 |
| 2012/0317370 | A1* | 12/2012 | Luna ................... H04L 67/1095 711/146 |
| 2013/0060884 | A1 | 3/2013 | Bernbo et al. |
| 2013/0073894 | A1 | 3/2013 | Xavier et al. |
| 2013/0339818 | A1* | 12/2013 | Baker ..................... G06F 11/10 714/763 |
| 2014/0047263 | A1 | 2/2014 | Coatney et al. |
| 2014/0136880 | A1 | 5/2014 | Shankar et al. |
| 2015/0227423 | A1* | 8/2015 | Reinart ............... G06F 11/1076 714/766 |
| 2015/0229338 | A1* | 8/2015 | Reinart ............... H03M 13/373 714/752 |

OTHER PUBLICATIONS

Hwang, Kai, Jin, Hai, Ho, Roy; RAID-x: A New Distributed Disk Array for I/O-Centric Cluster Computing.

Kim, Ju-Kyeong, et al.: "Data Access Frequency based Data Replication Method using Erasure Codes in Cloud Storage System", Journal of the Institute of Electronics and Information Engineers, Feb. 2014, vol. 51, No. 2, pp. 85-91.

* cited by examiner

PROFILE-DEPENDENT WRITE PLACEMENT OF DATA INTO A NON-VOLATILE SOLID-STATE STORAGE

BACKGROUND

Solid-state memory, such as flash, is currently in use in solid-state drives (SSD) to augment or replace conventional hard disk drives (HDD), writable CD (compact disk) or writable DVD (digital versatile disk) drives, collectively known as spinning media, and tape drives, for storage of large amounts of data. Flash and other solid-state memories have characteristics that differ from spinning media. Yet, many solid-state drives are designed to conform to hard disk drive standards for compatibility reasons, which makes it difficult to provide enhanced features or take advantage of unique aspects of flash and other solid-state memory. Flash memory is erased in blocks, which makes flash difficult to work with in lifecycle management of files stored in solid-state drives.

It is within this context that the embodiments arise.

SUMMARY

In some embodiments, a method for storing user data is provided. The method includes distributing the user data throughout a plurality of storage nodes through erasure coding, wherein the plurality of storage nodes are housed within a single chassis that couples the storage nodes as a cluster, each of the plurality of storage nodes having non-volatile solid-state memory for user data storage. The method includes performing analytics on user data and grouping portions of the user data according to results of the analytics. The method includes writing the user data to blocks of flash memory in the non-volatile solid-state memory, wherein each block receives portions of the user data grouped according to at least one of the results of the analytics.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
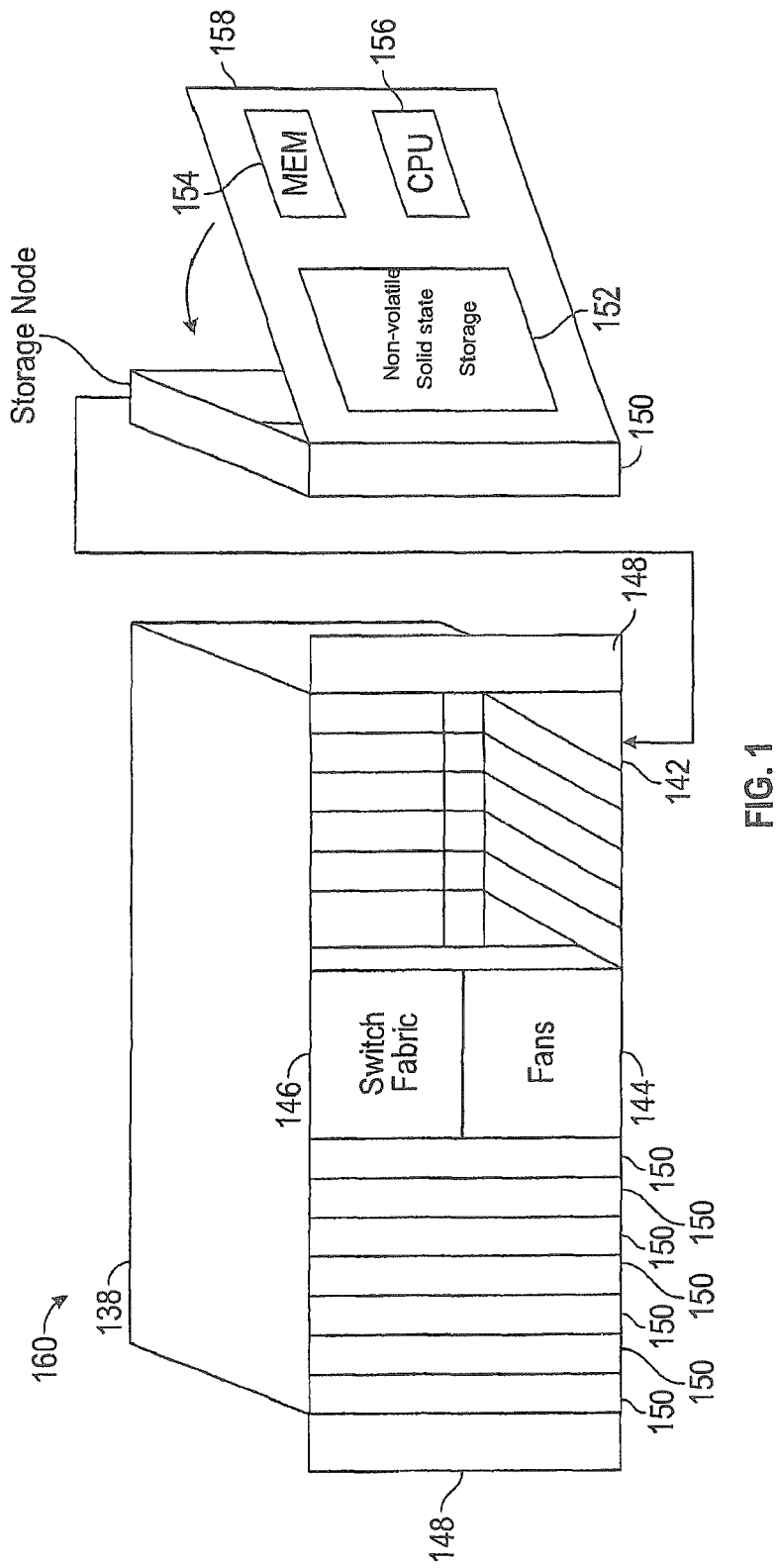
FIG. 1 is a perspective view of a storage cluster with multiple storage nodes and internal storage coupled to each storage node to provide network attached storage, in accordance with some embodiments.

The embodiments below describe a storage cluster that stores user data, such as user data originating from one or more user or client systems or other sources external to the storage cluster. The storage cluster distributes user data across storage nodes housed within a chassis, using erasure coding and redundant copies of metadata. Erasure coding refers to a method of data protection in which data is broken into fragments, expanded and encoded with redundant data pieces and stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster is contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid state memory units, which may be referred to as storage units. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

The storage nodes have one or more non-volatile solid-state storage units, each of which has non-volatile random-access memory (NVRAM) and flash memory, in some embodiments. The NVRAM and the flash memory are independently addressable by a processor of the storage node. Since flash memory is erased in blocks, some embodiments of the storage node and the non-volatile solid-state storage perform analytics on user data, sort the user data into groups, and write the user data into blocks in flash memory according to the sorting and the analytics. This mechanism increases or decreases the likelihood of holes in a flash block as files are trimmed. With more holes in the flash blocks, less valid data is required to be moved to another block reducing garbage collection time and improving garbage collection efficiency. With fewer holes in flash blocks, recovery of blocks for future writing is improved, as well as lifecycle management of files.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a single chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2:
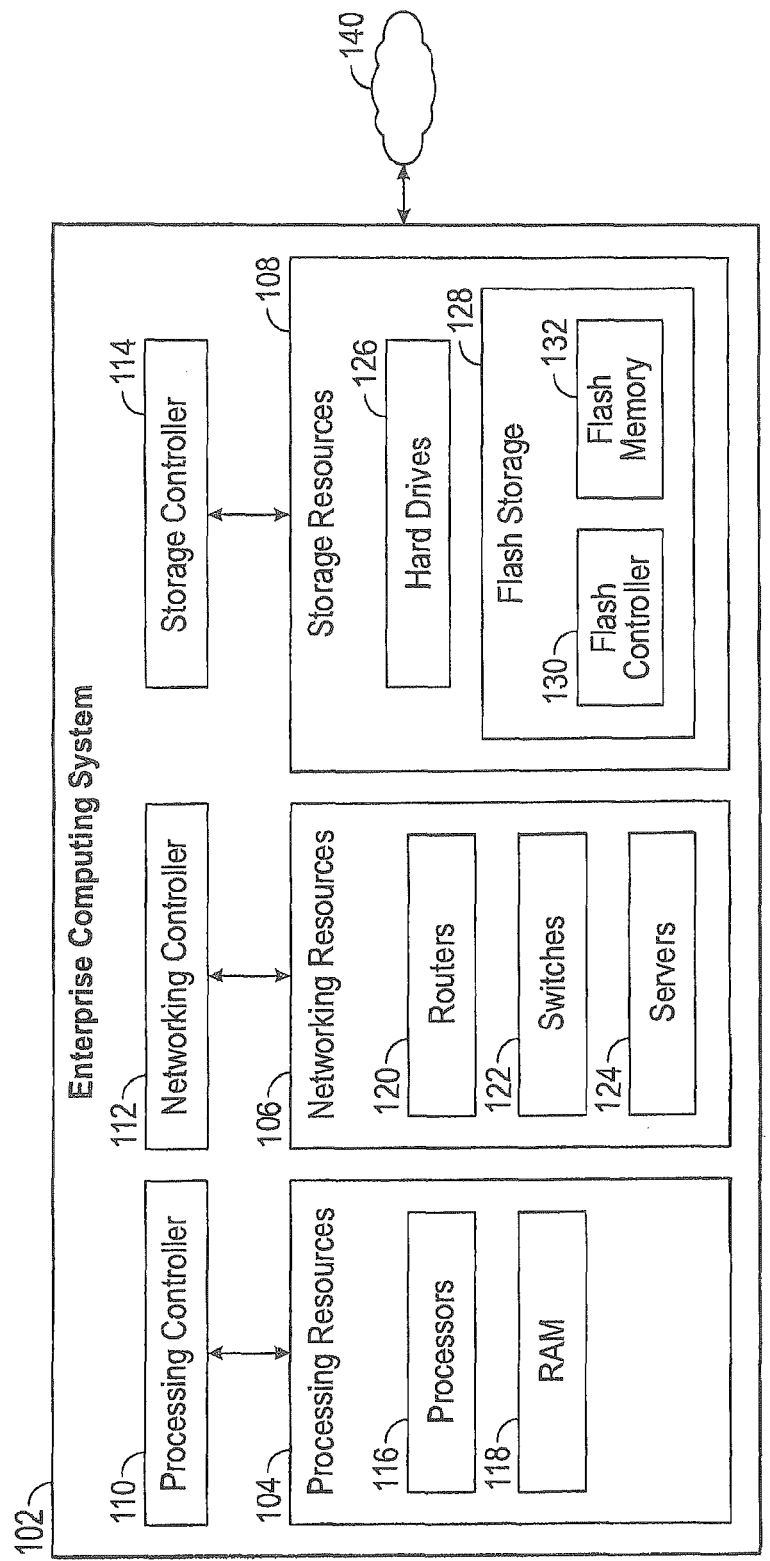
FIG. 2 is a system diagram of an enterprise computing system, which can use one or more of the storage clusters of FIG. 1 as a storage resource in some embodiments.

FIG. 2 is a system diagram of an enterprise computing system 102, which can use one or more of the storage nodes, storage clusters and/or non-volatile solid-state storage of FIG. 1 as a storage resource 108. For example, flash storage 128 of FIG. 2 may integrate the storage nodes, storage clusters and/or non-volatile solid-state storage of FIG. 1 in some embodiments. The enterprise computing system 102 has processing resources 104, networking resources 106 and storage resources 108, including flash storage 128. A flash controller 130 and flash memory 132 are included in the flash storage 128. In various embodiments, the flash storage 128 could include one or more storage nodes or storage clusters, with the flash controller 130 including the CPUs, and the flash memory 132 including the non-volatile solid-state storage of the storage nodes. In some embodiments flash memory 132 may include different types of flash memory or the same type of flash memory. The enterprise computing system 102 illustrates an environment suitable for deployment of the flash storage 128, although the flash storage 128 could be used in other computing systems or devices, larger or smaller, or in variations of the enterprise computing system 102, with fewer or additional resources. The enterprise computing system 102 can be coupled to a network 140, such as the Internet, in order to provide or make use of services. For example, the enterprise computing system 102 could provide cloud services, physical computing resources, or virtual computing services.

In the enterprise computing system 102, various resources are arranged and managed by various controllers. A processing controller 110 manages the processing resources 104, which include processors 116 and random-access memory (RAM) 118. Networking controller 112 manages the networking resources 106, which include routers 120, switches 122, and servers 124. A storage controller 114 manages storage resources 108, which include hard drives 126 and flash storage 128. Other types of processing resources, networking resources, and storage resources could be included with the embodiments. In some embodiments, the flash storage 128 completely replaces the hard drives 126. The enterprise computing system 102 can provide or allocate the various resources as physical computing resources, or in variations, as virtual computing resources supported by physical computing resources. For example, the various resources could be implemented using one or more servers executing software. Files or data objects, or other forms of data, are stored in the storage resources 108.

In various embodiments, an enterprise computing system 102 could include multiple racks populated by storage clusters, and these could be located in a single physical location such as in a cluster or a server farm. In other embodiments the multiple racks could be located at multiple physical locations such as in various cities, states or countries, connected by a network. Each of the racks, each of the storage clusters, each of the storage nodes, and each of the non-volatile solid-state storage could be individually configured with a respective amount of storage space, which is then reconfigurable independently of the others. Storage capacity can thus be flexibly added, upgraded, subtracted, recovered and/or reconfigured at each of the non-volatile solid-state storages. As mentioned previously, each storage node could implement one or more servers in some embodiments.

Figure 3:
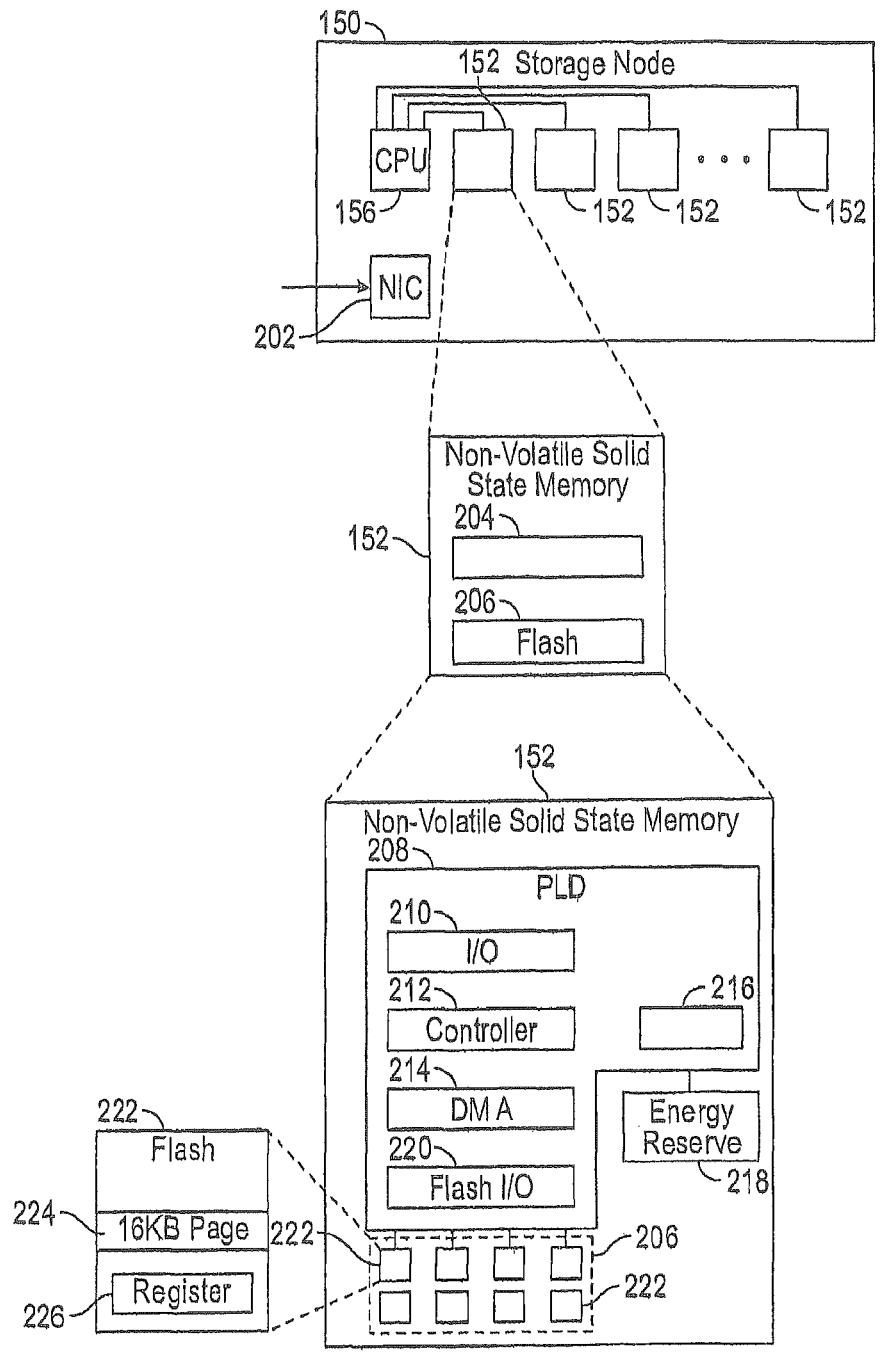
FIG. 3 is a multiple level block diagram, showing contents of a storage node and contents of one of the non-volatile solid-state storages in accordance with some embodiments.

FIG. 3 is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 3, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 3, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

In NVRAM 204, redundancy is not organized by segments but instead by messages, where each message (128 bytes to 128 kB) establishes its own data stripe, in some embodiments. NVRAM is maintained at the same redundancy as segment storage and operates within the same storage node groups in some embodiments. Because messages are stored individually the stripe width is determined both by message size and the storage cluster configuration. Larger messages may be more efficiently stored as wider strips.

Two of the many tasks of the CPU 156 on a storage node 150 are to break up write data, and reassemble read data. When the system has determined that data is to be written, an authority for that data is located in one of the non-volatile solid-state storages 152. The authority may be embodied as metadata, including one or more lists such as lists of data segments which the nonvolatile solid-state storage 152 manages. When a segment ID for data is already determined the request to write is forwarded to the non-volatile solid-state storage 152 currently determined to be the host of the authority determined from the segment. The host CPU 156 of the storage node 150, on which the non-volatile solid-state storage 152 and corresponding authority reside, then breaks up or shards the data and transmits the data out to various non-volatile solid-state storage 152. The transmitted data is written as a data stripe in accordance with an erasure coding scheme. In some embodiments, data is requested to be pulled, and in other embodiments, data is pushed. In reverse, when data is read, the authority for the segment ID containing the data is located as described above. The host CPU 156 of the storage node 150 on which the non-volatile solid-state storage 152 and corresponding authority reside requests the data from the non-volatile solid-state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid-state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment may be an address space between medium address space and physical flash locations. Each data segment is protected, e.g., from memory and other failures, by breaking the segment into a number of data and parity shards, where applicable. The data and parity shards are distributed, i.e., striped, across non-volatile solid-state storages 152 coupled to the host CPUs 156 in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top is the inode address space, which the filesystem uses to translate file paths to inode IDs (Identifications). Inodes point into medium address space, where data is logically stored. Medium addresses are mapped into segment address space. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid-state storage 152 may be assigned a range of address space. Within this assigned range, the non-volatile solid-state storage 152 is able to allocate addresses without synchronization with other non-volatile solid-state storage 152.

Data and metadata are stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Data is not further replicated within a storage cluster, as it is assumed a storage cluster may fail. Reed-Solomon encoding is used within a storage cluster, and mirroring is used within a storage grid in some embodiments. Metadata may be stored using an ordered log structured index (such as a Log Structured Merge Tree), and large data may be stored in an unordered log structured layout (similar to log structured file systems).

Figure 4:
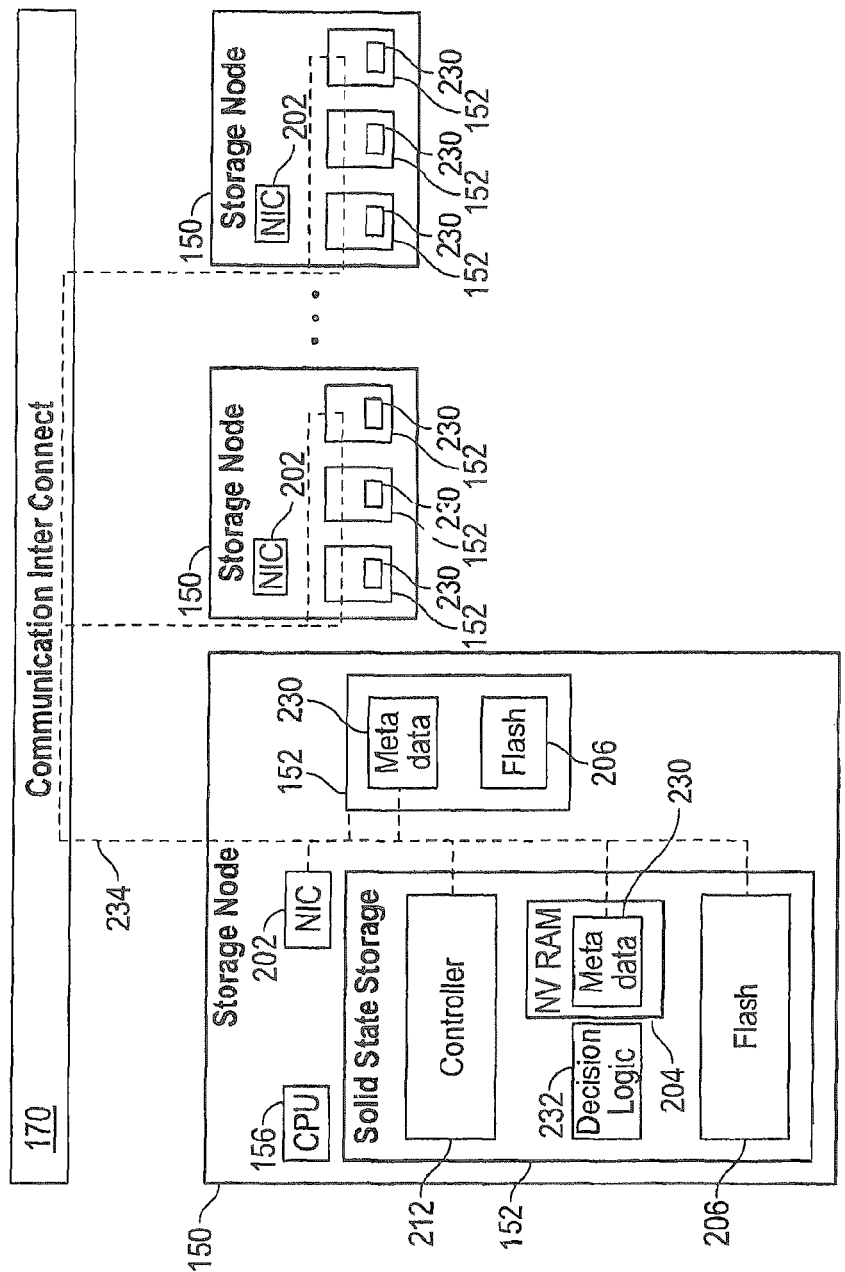
FIG. 4 is a block diagram showing a communication path for redundant copies of metadata, with further details of storage nodes and solid-state storages in accordance with some embodiments.

FIG. 4 is a block diagram showing a communication path 234 for redundant copies of metadata 230, with further details of flash storage nodes 150 (i.e., storage nodes 150 having flash memory) and non-volatile solid-state storages 152 in accordance with some embodiments. Metadata 230 includes information about the user data that is written to or read from the flash memory 206. Metadata 230 can include messages, or derivations from the messages, indicating actions to be taken or actions that have taken place involving the data that is written to or read from the flash memory 206. Distributing redundant copies of metadata 230 to the non-volatile solid-state storage units 152 through the communication interconnect 170 ensures that messages are persisted and can survive various types of failure the system may experience. Each non-volatile solid-state storage 152 dedicates a portion of the NVRAM 204 to storing metadata 230. In some embodiments, redundant copies of metadata 230 are stored in the additional non-volatile solid-state storage 152.

Flash storage nodes 150 are coupled via the communication interconnect 170. More specifically, the network interface controller 202 of each storage node 150 in the storage cluster is coupled to the communication interconnect 170, providing a communication path 234 among storage nodes 150 and non-volatile solid-state storage 152. Storage nodes 150 have one or more non-volatile solid-state storage units 152. Non-volatile solid-state storage units 152 internal to a storage node can communicate with each other, for example via a bus, a serial communication path, a network path or other communication path 234 as readily devised in accordance with the embodiments disclosed herein. Communication interconnect 170 can be included in or implemented with the switch fabric of FIG. 1 in some embodiments. Storage nodes 150 of FIG. 4 form a storage cluster that is enclosed within a single chassis that has an internal power distribution bus within the chassis as described with reference to FIG. 1.

Referring to FIGS. 3 and 4, in case of a power failure, whether local to non-volatile solid-state storage 152 or a storage node 150, data can be copied from the NVRAM 204 to the flash memory 206. For example, the DMA unit 214 of FIG. 3 can copy contents of the NVRAM 204, including the metadata, to the flash memory 206, using power supplied by the energy reserve 218. Energy reserve 218 is sized with sufficient capacity to support copy operation. That is, the energy reserve 218 should be sized so as to provide sufficient current at a sufficient voltage level for a time duration long enough to complete the copying so that messages that are in metadata 230 are persisted in the flash memory 206.

A further mechanism for persisting messages in a storage system involves the communication path 234 described above in FIG. 4. Redundant copies of the metadata 230 can be distributed via the communication path 234, in various ways. For example, a message coming from the filesystem could be distributed via the communication interconnect 170 as a broadcast over the communication path 234 to all of the non-volatile solid-state storages 152. A non-volatile solid-state storage 152 could send a copy of metadata 230 over the communication path 234 to other non-volatile solid-state storage 152 in a storage node 150. CPU 156 on a storage node 150, receiving a message from the communication interconnect 170 via the network interface controller 202 could send a copy of the message to each solid-state storage 152. The CPU 156 may rebroadcast the message to other flash storage nodes 150, and the flash storage nodes 150 could then distribute the message to the solid-state storages 152 in each of these flash storage nodes 150 in some embodiments. In these and other uses of the communication path 234, redundant copies of the metadata 230 can be distributed to the non-volatile solid-state storages 152. Then, if one non-volatile solid-state storage 152, or one storage node 150 experiences a failure, redundant copies of any message are available in metadata 230 of at least one other non-volatile solid-state storage 152. Each non-volatile solid-state storage 152 can apply decision logic 232 when evaluating various situations such as local power failure, an unreachable node, or instructions to consider or commence a data recovery or a data rebuild. The decision logic 232 includes witnessing logic, voting logic, consensus logic and/or other types of decision logic in various embodiments. Decision logic 232 could be implemented in hardware, software executing on the controller 212, firmware, or combinations thereof, and could be implemented as part of the controller 212 or coupled to the controller 212. The decision logic 232 is employed in consensus decisions among multiple solid-state storage units 152, in some embodiments. In further embodiments, the decision logic 232 could cooperate with the other non-volatile solid-state storage units 152 in order to gather copies of the redundant metadata 230, and make local decisions. The mechanisms for persisting messages in a storage system are useful in the event of a failure, and can be used in data recovery and reconstruction as described above.

Examples of messages include a request to write data, a request to read data, a request to lock or unlock a file, a change in permission of a file, an update to a file allocation table or other file or directory structure, a request to write a file that has executable instructions or to write a file name that is reserved and interpreted as an executable direction, updates to one or more authorities, updates to a fingerprint table, list or other data used in deduplication, updates to hash tables, updates to logs, and so on. When a message is received in non-volatile solid-state storage 152 of a storage node 150, indicating some action has taken place, the message or a derivation of the message is stored as metadata 230 in the NVRAM 204 of that solid-state storage 152. By applying the redundant copies of the metadata 230, actions are captured that are in progress, so that if a failure happens, these actions can be replayed and replacement actions can then be performed, for example upon restart. Actions span storage nodes and use cluster messaging, so the act of sending a message can be made persistent data via one or more of the mechanisms for persisting messages. These mechanisms address some of the known failure scenarios in order to ensure availability of data. In some embodiments, the messages don't require permanence beyond completion of the actions. In other embodiments the messages are further retained to facilitate rollback or other recovery operations.

For example, if a command is sent out to carry out a write operation, this message is recorded and redundant. If there is a failure, it can be determined whether or not that action has been carried out, and whether or not the action should be driven to completion. Such determination can be carried out using the decision logic 232 in each non-volatile solid-state storage 152. There is dedicated storage in NVRAM 204 for messages and other metadata 230, so that messages are recorded in the non-volatile solid-state storage 152 and replicated in some embodiments. The messages and other metadata 230 are written into flash memory 206 if one non-volatile solid-state storage 152 experiences a power failure, or if the entire system experiences a power failure or otherwise shuts down. The redundancy level of the messages matches the redundancy level of the metadata in some embodiments. When there are sufficient numbers of copies of messages, the message becomes irrevocable. If one node goes down, other nodes can vote, achieve consensus, or witness the various copies of the message and determine what action, if any, to carry to completion. If the entire system goes down, e.g., through a global power failure, then a sufficient number of these messages get written from NVRAM 204 to flash memory 206. Upon restoration of power, the nodes can again open copies of the message and determine what action, if any, to carry to completion to prevent any corruption.

Figure 5:
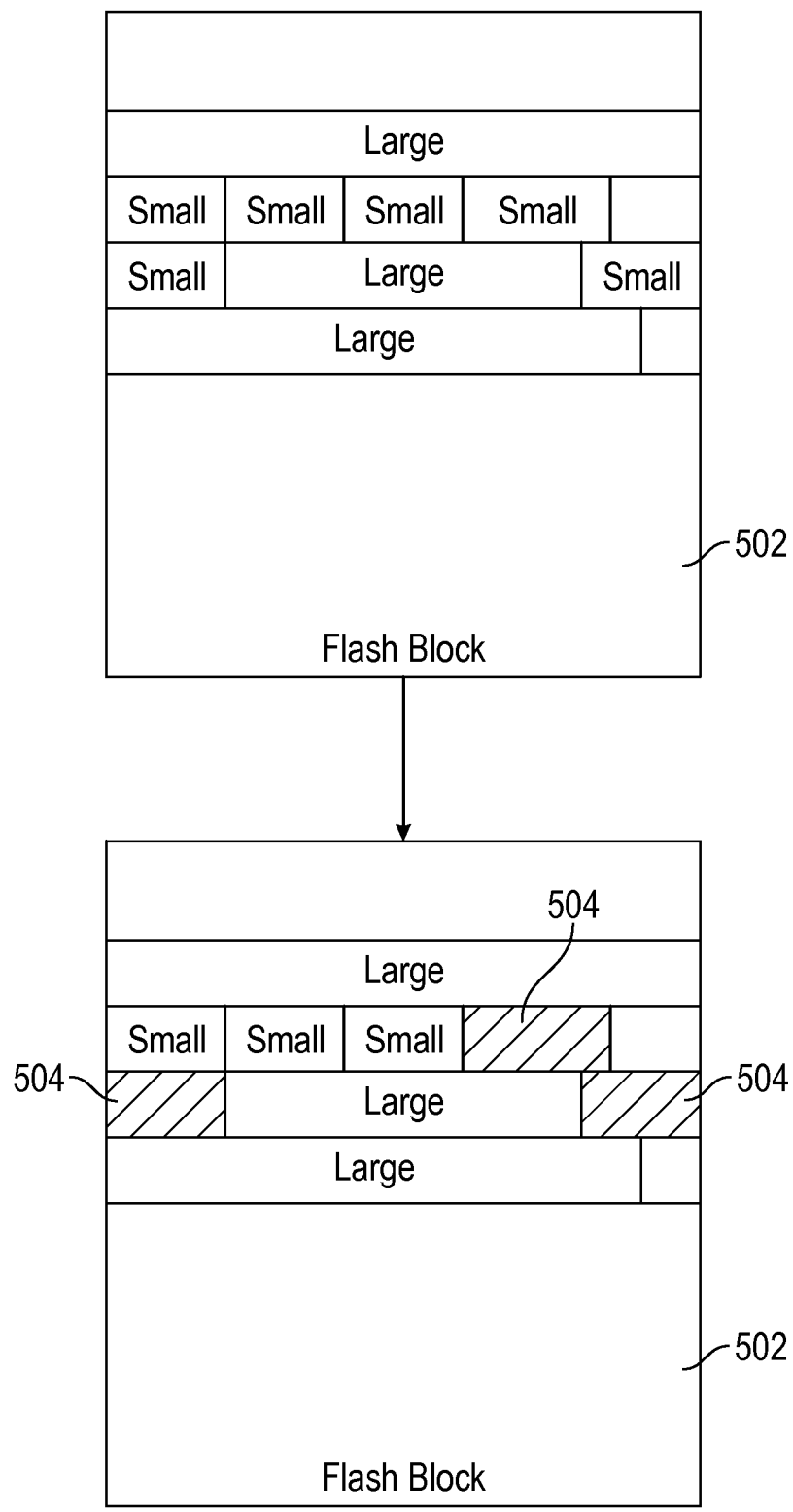
FIG. 5 is a memory diagram showing holes in a block in flash memory, as a result of trimming files.

FIG. 5 is a memory diagram showing holes 504 in a block 502 in flash memory, as a result of trimming files. Flash memory can be written to once per location, until an entire block 502 (also known as an erase block or a flash block) is erased, at which point the flash memory in the block 502 can be written to again. Writing a mixture of large and small files, or portions of files, to a flash block 502 as depicted in the upper half of FIG. 5 can lead to the holes 504 in the flash block 502. As files are trimmed, such as when files are obsoleted or portions of files are replaced with edits or updates, the files or portions of files are deallocated from the flash block 502. These deallocated files or portions of files then become holes 504 in the flash block 502, which cannot be written to until the flash block 502 is erased. A relatively large number of holes 504 may exist in flash block 502. This situation occurs when flash block 502 cannot be erased because other files or portions of files are still valid or in use in flash block 502. The relatively large number of holes 504 is an inefficient use of flash block 502. Various circumstances, such as combinations of data portions with differing lifespans, can lead to the presence of excess holes 504 in a flash block 502, preventing ready recovery of the flash block

502. The mechanism depicted in FIGS. 6-8 greatly decreases the likelihood of holes 504 in a flash block 502.

Figure 6:
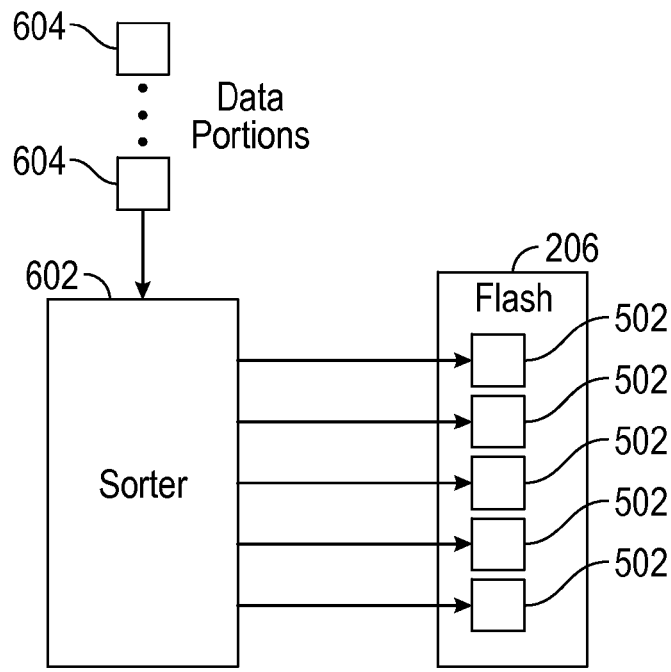
FIG. 6 is a block diagram of a sorter performing analysis of user data and writing portions of user data to blocks in flash memory.

FIG. 6 is a block diagram of a sorter 602 performing analysis of user data and writing data portions 604 of the user data to blocks 502 in flash memory 206. In various embodiments, the sorter 602 could be implemented in hardware, firmware, or software executing in the CPU of a storage node, the controller of a non-volatile solid-state storage unit, or one or more further processors, or various combinations thereof. As writes arrive from a client, the data portions 604 arrive at the sorter 602. Each data portion could be a file, a portion of a file, a data segment, or a data shard in various embodiments as described above. The sorter 602 performs analytics on the user data, through metadata and access patterns. The access patterns could include frequent updates to user data, or long-term storage of user data. In analyzing the user data or data portions 604, the sorter 602 looks for common characteristics and sorts the data portions 604 into groups. The sorter 602 then writes the data portions 604 to various flash blocks 502 in the flash memory 206, according to the groups, i.e., according to the sorting and the results of the analytics. The result of these actions by the sorter 602 places files or portions of files with related characteristics into a flash block 502 so that when those files or portions of files are trimmed, the entire flash block 502 can be recovered.

Files could be grouped according to file size in some embodiments. Files that are below a specified size could be written to one set of flash blocks 502, and files that are greater than or equal to the specified size could be written to a differing set of flash blocks 502. Files with a short expected lifespan could be written to one set of flash blocks 502, and files with longer expected lifespans could be written to a differing set of flash blocks 502. Files that are written end-to-end, i.e., the entire file is written from beginning to end without interruption or alteration, could be written to one set of flash blocks 502, and files that are updated or altered could be written to a differing set of flash blocks 502. If files from one client tend to be updated frequently, and files from another client tend to be stored long-term without changes (e.g., edits, updates, revisions), files could be sorted according to Internet Protocol (IP) addresses, in one embodiment. In some embodiments where the client may have multiple IP addresses, e.g., a mobile computing device, the multiple IP addresses may be grouped together and associated with the client through file information or other metadata. Files from one IP address could be sent to one set of flash blocks 502, and files from another IP address could be sent to another set of flash blocks 502. More than two usage patterns or more than two IP addresses may be specified in these embodiments. In any of the above described examples multiple ranges may be used in each of the embodiments. For example, multiple file size ranges, multiple expected lifespan ranges, multiple frequency ranges, and so on may be utilized with the corresponding embodiments. The examples listed are not meant to be limiting as other groupings may be integrated into the embodiments and the embodiments are not limited to IP addresses utilized for sorting files as any unique identifier may be integrated into the embodiments.

Still referring to FIG. 6, the analytics, groupings, sorting, and writing to differing flash blocks 502 are not based on expected or required access times, data throughput rates, or other read or write-based performance criteria for the user data in some embodiments. Rather, the analytics, groupings, sorting and writing are based on characteristics of the data portions 604 of the user data that lead to or result in increase or reduction in holes 504 in individual flash blocks 502. Some embodiments utilize access patterns while data is in NVRAM 204, awaiting transfer to flash memory 206. Grouping can then be based on whether or not data is updated while in NVRAM 204, as described below.

Figure 7:
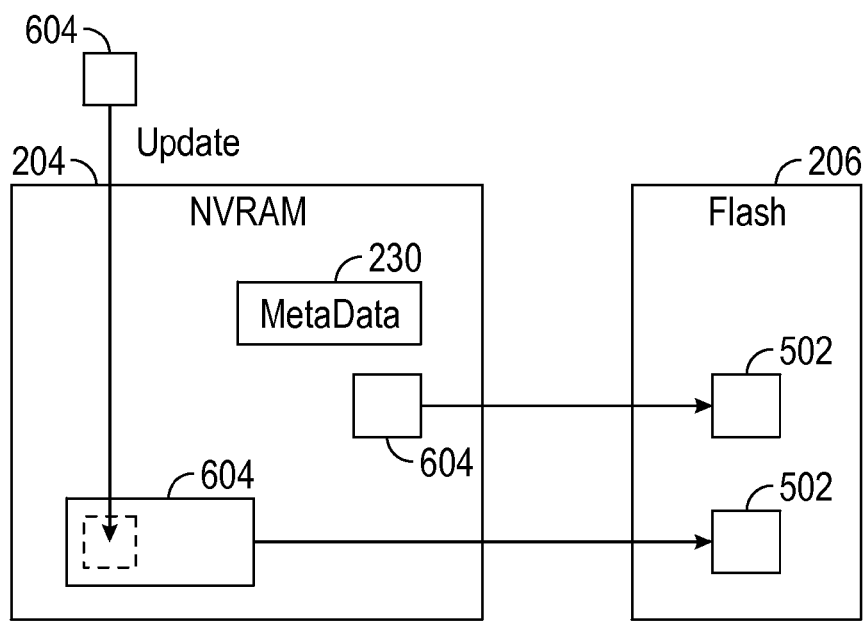
FIG. 7 is a block diagram showing a detail of a sorting operation in an embodiment of the sorter of FIG. 6, with sorting based on file updates.

FIG. 7 is a block diagram showing a detail of a sorting operation in an embodiment of the sorter 602 of FIG. 6, with sorting based on file updates. Various data portions 604 are shown residing in the NVRAM 204. The system maintains metadata 230 in the NVRAM 204, although the metadata 230 could be maintained elsewhere in the system in various embodiments. In this scenario, a data portion 604 arrives as an update to one of the data portions 604 in the NVRAM 204. The sorter 602 (see FIG. 6) recognizes or detects the update to one of the data portion 604 in the NVRAM 204, and writes the data portion 604 with the update to one of the flash blocks 502 in the flash memory 206. The sorter 602 writes the data portion 604 that did not receive any updates to a differing one of the flash blocks 502. In variations, the sorter 602 could look for updates that happen sooner than a specified time span, or more frequently than a specified parameter over a specified time span, and send data portions 604 matching these criteria to one set of flash blocks 502. Other data portions 604, which don't match these criteria, could be sent to a differing set of flash blocks 502. Variations of analytics relating to updates of user data, and associated parameters, are readily devised in accordance with the teachings disclosed herein.

Figure 8:
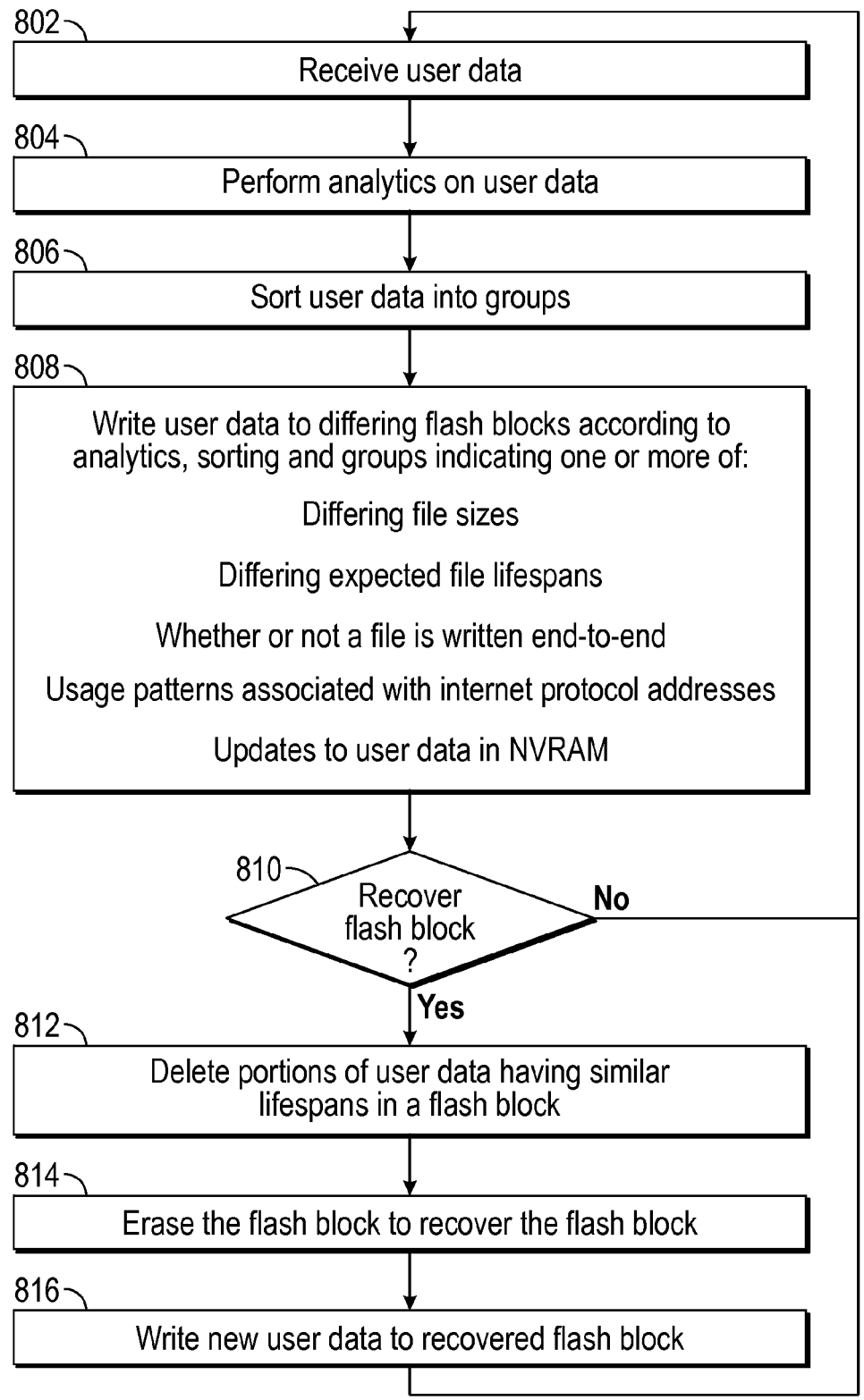
FIG. 8 is a flow diagram of a method for placing user data in a non-volatile solid-state storage, which can be practiced on or by embodiments of storage clusters, storage nodes and/or non-volatile solid-state storages in accordance with some embodiments.

FIG. 8 is a flow diagram of a method for placing user data in a non-volatile solid-state storage, which can be practiced on or by embodiments of storage clusters, storage nodes and/or non-volatile solid-state storages in accordance with some embodiments. Portions or all of the method can be performed by embodiments of the sorter shown in FIGS. 6 and 7. User data is received, in an action 802. The user data could arrive as files according to a filesystem, or in another format, and could be split into data portions such as segments or shards. Analytics are performed on the user data, in an action 804. These analytics could be performed on metadata and look for characteristics of the user data or usage patterns of the user data. The user data is sorted into groups, in an action 806, which may be based on the results of the analytics.

In an action 808, the user data is written to differing flash blocks. The writing is according to the analytics, the sorting and the groups, which indicate various characteristics of the user data. The analytics, sorting and groups could indicate differing file sizes, differing expected file lifespans, whether or not a file is written end-to-end, usage patterns associated with Internet Protocol addresses, updates to user data, etc. In some embodiments, portions of user data with differing results of the analytics are written to differing flash blocks as described with reference to FIG. 7. Various parameters for establishing ranges of the results and ranges for writing to various flash blocks are readily devised. In decision action 810, it is determined if the system should recover a flask block. This determination may be made in the context of garbage collection operations, user data lifecycle management, memory management or other operations of a storage cluster, storage node or non-volatile solid-state storage. If the answer is no, flow branches back to the action 802, in order to receive further user data and repeat as described above. If the answer is yes, flow proceeds to action 812.

In the action 812, portions of user data having similar lifespans in a flash block are deleted. This could be performed through deallocation of portions of the flash block, i.e., deallocation of flash memory in specified address ranges in a flash block such as garbage collection operations. This deallocation could occur in response to obsoleting user data, or editing, revising or updating user data, or performing these operations on metadata stored in the flash block. In some embodiments, if small amounts of valid user data or metadata remain in the flash block, these amounts could be copied to a differing flash block so that memory space in the flash block is available for deallocation. Writing user data to differing flash blocks, according to the analytics, sorting and groups, result in the data portions having similar lifespans grouped together in the flash block, thereby improving ease of recovering the flash block. In some embodiments, garbage collection operations are improved by reducing the number of pages to move. In an action 814, the flash block is erased to recover the flash block. This operation could occur when all portions of the flash block have been deallocated so that no valid user data or metadata remains in the flash block. New user data is written to the recovered flash block, in an action 816. Flow then proceeds back to the action 802, to receive further user data.

Figure 9:
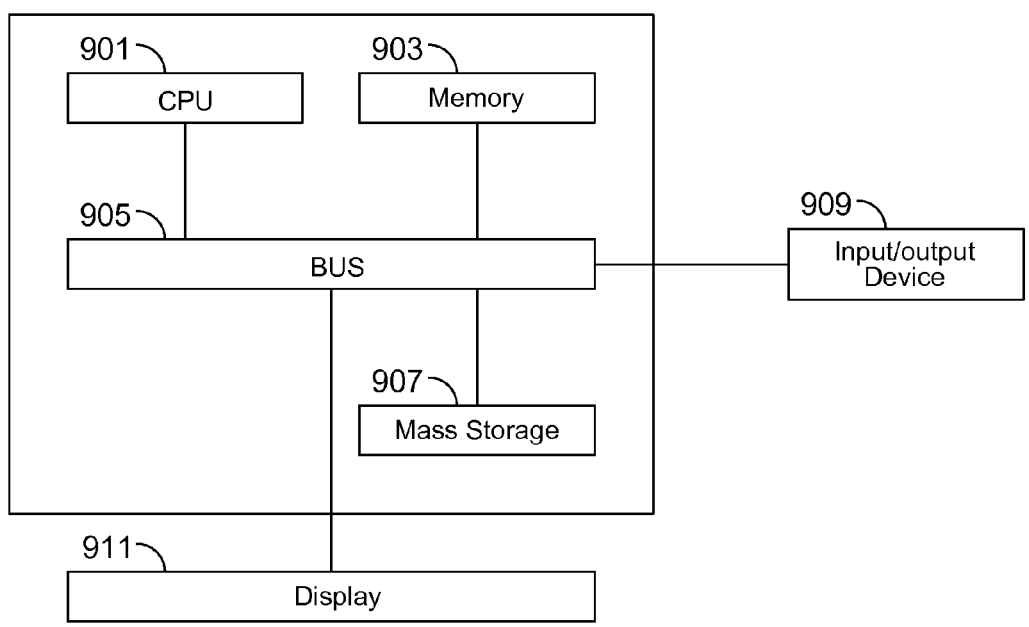
FIG. 9 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 9 is an illustration showing an exemplary computing device which may implement the embodiments described herein. The computing device of FIG. 9 may be used to perform embodiments of the functionality for a storage node or a non-volatile solid-state storage in accordance with some embodiments. The computing device includes a central processing unit (CPU) 901, which is coupled through a bus 905 to a memory 903, and mass storage device 907. Mass storage device 907 represents a persistent data storage device such as a disc drive, which may be local or remote in some embodiments. The mass storage device 907 could implement a backup storage, in some embodiments. Memory 903 may include read only memory, random access memory, etc. Applications resident on the computing device may be stored on or accessed via a computer readable medium such as memory 903 or mass storage device 907 in some embodiments. Applications may also be in the form of modulated electronic signals modulated accessed via a network modem or other network interface of the computing device. It should be appreciated that CPU 901 may be embodied in a general-purpose processor, a special purpose processor, or a specially programmed logic device in some embodiments.

Display 911 is in communication with CPU 901, memory 903, and mass storage device 907, through bus 905. Display 911 is configured to display any visualization tools or reports associated with the system described herein. Input/output device 909 is coupled to bus 905 in order to communicate information in command selections to CPU 901. It should be appreciated that data to and from external devices may be communicated through the input/output device 909. CPU 901 can be defined to execute the functionality described herein to enable the functionality described with reference to FIGS. 1-8. The code embodying this functionality may be stored within memory 903 or mass storage device 907 for execution by a processor such as CPU 901 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for storing user data, comprising:
distributing the user data throughout a plurality of storage nodes through erasure coding, each of the plurality of storage nodes having nonvolatile solid-state memory for user data storage, the distributing comprising:
determining an authority for a data segment from a data segment identifier;
determining a storage node on which the authority resides; and
distributing a plurality of data shards based on the data segment to storage nodes pointed to by the authority;
performing analytics on user data, including determining whether an update arrives to a data shard in a first memory of a storage node while the data shard is awaiting transfer, with further data shards, from the first memory to the nonvolatile solid-state memory of the storage nodes;
grouping portions of the user data according to results of the analytics; and
writing the user data to blocks of the nonvolatile solid-state memory, wherein each block of the nonvolatile solid-state memory receives portions of the user data grouped according to at least one of the results of the analytics and at least one block of the nonvolatile solid-state memory receives data shards grouped according to the determining.

2. The method of claim 1, wherein the analytics are through metadata and access patterns and are unrelated to access time of the user data in the non-volatile solid-state memory.

3. The method of claim 1, wherein the determining as at least one of the results of the analytics indicates whether or not a portion of the user data is updated in non-volatile random-access memory (NVRAM) as the first memory.

4. The method of claim 1, wherein the at least one of the results of the analytics indicates whether or not a file is written end-to-end.

5. The method of claim 1, wherein the at least one of the results of the analytics indicates an expected file lifespan.

6. The method of claim 1, wherein the at least one of the results of the analytics indicates a usage pattern associated with an Internet Protocol (IP) address and wherein at least one block receives data grouped according to IP address.

7. The method of claim 1, wherein the at least one of the results of the analytics indicates whether or not a file is updated more frequently than a specified parameter.

8. A method for placing user data in a non-volatile solid-state storage, comprising:

determining an authority for a data segment from a data segment identifier;

determining on which storage node, of a plurality of storage nodes, the authority resides;

distributing a plurality of data shards based on the data segment to storage nodes, of the plurality of storage nodes, pointed to by the authority;

analyzing metadata and access patterns relative to user data, including determining whether an update arrives to a data shard in a first memory of a storage node while the data shard is awaiting transfer from the first memory to nonvolatile solid-state memory of the storage nodes;

sorting the user data into a plurality of groups, based on results of the analyzing; and placing the plurality of groups of user data into blocks of flash memory in the non-volatile solid-state storage, such that a first block of flash memory in the non-volatile solid-state storage has at least a portion of a first one of the plurality of groups of user data including data shards having a positive result of the determining and transferred from the first memory and a second block of flash memory in the non-volatile solid-state storage has at least a portion of a second one of the plurality of groups of user data having a negative result of the determining.

9. The method of claim 8, wherein the analyzing and sorting are performed by a host processor communicating with the non-volatile solid-state storage.

10. The method of claim 8, further comprising:
obsoleting all of the user data in one of the blocks of flash memory in the non-volatile solid-state storage; and
erasing the one of the blocks of flash memory, to recover the one of the blocks of flash memory for future writing.

11. The method of claim 8, wherein sorting the user data into a plurality of groups includes sorting the user data by file size.

12. The method of claim 8, wherein sorting the user data into a plurality of groups includes sorting the user data by expected file lifespan.

13. The method of claim 8, wherein sorting the user data into a plurality of groups includes sorting the user data by source Internet Protocol (IP) address, and wherein a third block of flash memory has at least a portion of a third one of the plurality of groups of user data sorted according to IP address.

14. The method of claim 8, wherein sorting the user data into a plurality of groups includes sorting the user data by whether or not the user data is updated in a non-volatile random-access memory (NVRAM) of the non-volatile solid-state storage prior to transfer to the flash memory.

15. A storage cluster comprising:
a plurality of storage nodes, each of the plurality of storage nodes having nonvolatile solid-state memory for storage of user data, and a first memory configured to hold data shards awaiting transfer to the nonvolatile solid-state memory;
the plurality of storage nodes configurable to distribute the user data by determining an authority for a data segment from a data segment identifier, determine a storage node on which the authority resides, and distribute a plurality of data shards based on the data segment to storage nodes pointed to by the authority; and the nonvolatile solid-state memory comprising:
a sorter, coupled to the at least one non-volatile solid-state storage, the sorter configured to perform actions including:
analyzing user data as to metadata and access patterns, including determining whether an update arrives to a data shard in the first memory of a storage node while the data shard is awaiting transfer from the first memory to the nonvolatile solid-state memory of the storage node; and
writing the user data into a plurality of blocks of the nonvolatile solid-state memory according to the analyzing, wherein each of the plurality of blocks of the nonvolatile solid-state memory receives portions of the user data grouped according to like characteristics based on the metadata and access patterns and wherein at least one block of the nonvolatile solid-state memory receives data shards grouped according to the determining.

16. The storage cluster of claim 15, wherein writing the user data into a plurality of blocks comprises:
writing at least portions of files having less than a specified file size to a first flash memory block; and
writing at least portions of files having greater than or equal the specified file size to a second flash memory block.

17. The storage cluster of claim 15, further comprising:
the at least one non-volatile solid-state storage further having non-volatile random-access memory (NVRAM) as the first memory, wherein writing the user data into a plurality of blocks comprises:
writing at least portions of user data having updates to the portions of user data while the portions of user data reside in the NVRAM to a first flash memory block as the at least one block; and
writing at least portions of user data that have no updates in the NVRAM to a second flash memory block.

18. The storage cluster of claim 15, wherein writing the user data comprises:
writing at least portions of files of a first expected file lifespan to a first flash memory block; and
writing at least portions of files of a second expected file lifespan to a second flash memory block.

19. The storage cluster of claim 15, wherein writing the user data comprises:
writing at least portions of files that are written end-to-end to a first flash memory block; and
writing at least portions of files that have updates to a second flash memory block.

20. The storage cluster of claim 15, wherein writing the user data comprises:
writing at least portions of files that have a first Internet Protocol (IP) address to a first flash memory block; and
writing at least portions of files that have a second IP address to a second flash memory block.

* * * * *